(12) United States Patent
Schobben et al.

(10) Patent No.: US 7,365,707 B2
(45) Date of Patent: Apr. 29, 2008

(54) DISPLAY SYSTEM FOR DISPLAYING IMAGES WITHIN A VEHICLE

(75) Inventors: Daniel Willem Elisabeth Schobben, Eindhoven (NL); Peter-Andre Redert, Eindhoven (NL); Atul Narendranath Sinha, Cupertino, CA (US); Marc Joseph Rita Op De Beeck, Eindhoven (NL); Piotr Wilinski, Eindhoven (NL); Willem Lubertus Ijzerman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 457 days.

(21) Appl. No.: 10/524,572

(22) PCT Filed: Jul. 31, 2003

(86) PCT No.: PCT/IB03/03844

§ 371 (c)(1),
(2), (4) Date: Feb. 15, 2005

(87) PCT Pub. No.: WO2004/016460

PCT Pub. Date: Feb. 26, 2004

(65) Prior Publication Data

US 2005/0248503 A1     Nov. 10, 2005

(30) Foreign Application Priority Data

Aug. 19, 2002  (EP)  .................................. 02078417
May 21, 2003  (EP)  .................................. 03101452

(51) Int. Cl.
*G09G 5/00* (2006.01)

(52) U.S. Cl. ......................................................... 345/9
(58) Field of Classification Search .................... 345/6, 345/7, 9, 32; 348/42, 47, 54, 59; 359/13
See application file for complete search history.

(56) References Cited

U.S. PATENT DOCUMENTS 5,467,102 A * 11/1995 Kuno et al. ................... 345/1.3

(Continued)

FOREIGN PATENT DOCUMENTS

DE           19920789 A1     5/2000

(Continued)

OTHER PUBLICATIONS

Malcolm McMorick, et al: 3-D Words: Physics World, Jun. 1992.

(Continued)

*Primary Examiner*—Amr A. Awad
*Assistant Examiner*—Dennis P Joseph

(57) ABSTRACT

A display system (100) for displaying images from different data streams (1,2) simultaneously is described. Images corresponding to the first data stream (1) are shown to a first observer (106) in a vehicle and images corresponding to the second data stream (2) are shown to a second observer (108) in the vehicle. The display system (100) comprises: a display screen (102 for generating a first one of the images and a second one of the images; and an optical selection screen (104) for selectively passing the first one of the images in a first direction (101) towards the first observer (106) and passing the second one of the image second direction (103) towards the second observer (108). It is advantageously that the display screen (102) generates images both data streams (1,2).

12 Claims, 15 Drawing Sheets

U.S. PATENT DOCUMENTS

Figure 1:
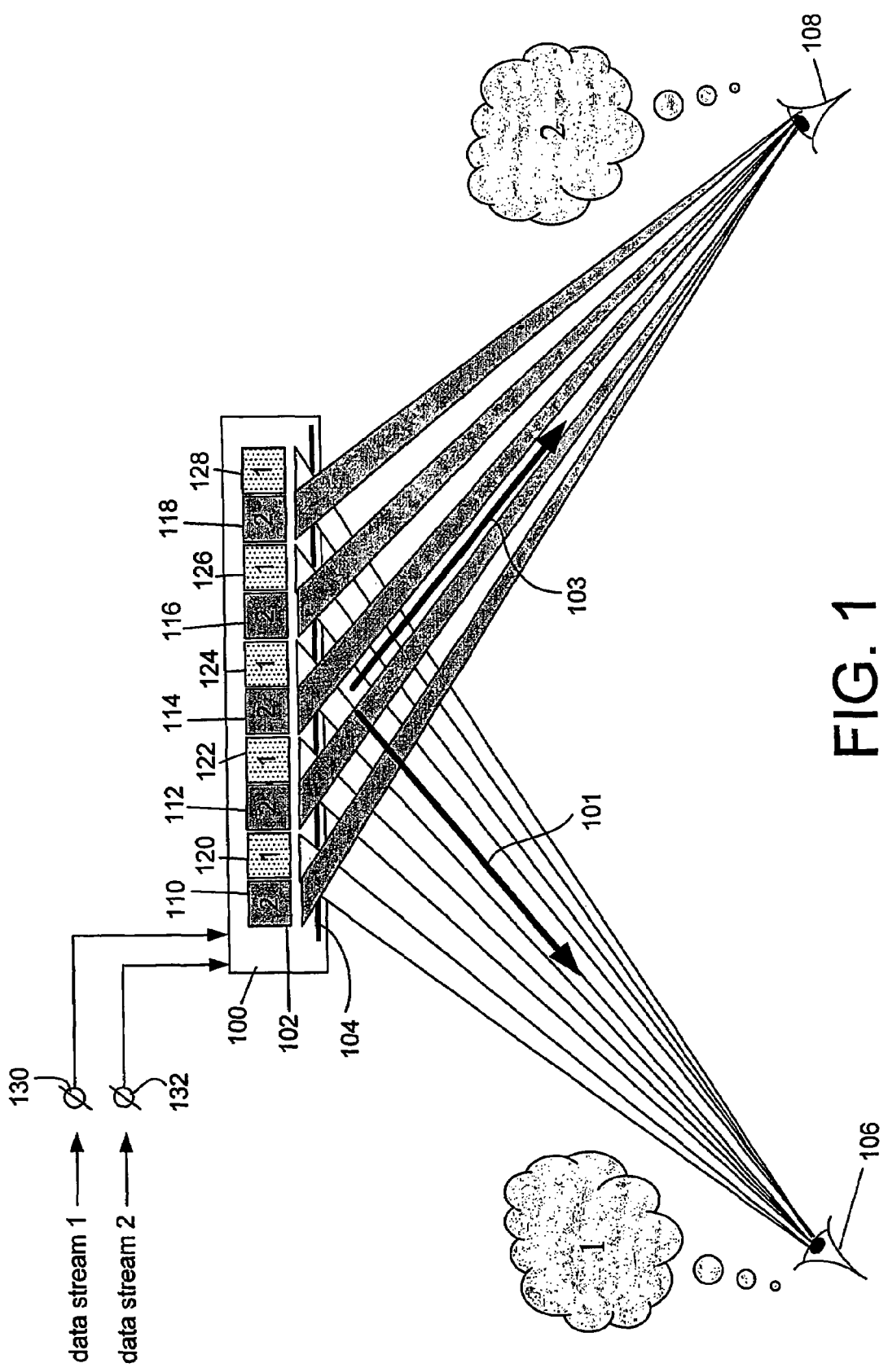

| | | | |
|---|---|---|---|
| 5,724,358 A | | 3/1998 | Headrocl et al. |
| 5,825,337 A | * | 10/1998 | Wiseman et al. ............... 345/6 |
| 5,880,704 A | * | 3/1999 | Takezaki ........................ 345/6 |
| 6,055,013 A | * | 4/2000 | Woodgate et al. ............ 348/59 |
| 6,231,201 B1 | | 5/2001 | Rupp |
| RE37,610 E | * | 3/2002 | Tsuchiya et al. ............. 340/435 |
| 6,462,871 B1 | * | 10/2002 | Morishima .................. 359/463 |
| 6,750,832 B1 | | 6/2004 | Kleinschmidt |
| 2001/0022563 A1 | * | 9/2001 | Ishikawa ........................ 345/9 |

FOREIGN PATENT DOCUMENTS

| | | |
|---|---|---|
| EP | 1029730 A1 | 8/2000 |
| EP | 1029730 B1 | 8/2000 |
| JP | 07103784 A | 8/1995 |
| JP | 07261689 A | 10/1995 |
| JP | 200224499 A | 8/2000 |
| WO | WO9809842 | 3/1998 |

OTHER PUBLICATIONS

J. P. Clerc, et al: Highly Multiplexed Super Hometropic LCD: Stanley Co. Ltd Japan 1998.

S. Yamauchi, et al: Homeotropic-Alignment Full-Color LCD 1989 SID, pp. 378-381.

S. Kobayashi: Preparation of Alphanumeric Indicators with Liquid Crystals: SID, paper III 68, 1972, USA, pp. 68-69.

Henk De Koning, et al: Dynamic Contrast Filter to Improve the Luminance Contrast Performance of Vathode Ray Tubes IDW 2000, pp. 553-556.

Neil Davies, et al: Three-Dimensional Imaging Systems: A New Development vol. 27, No. 21, Nov. 2001 1988, pp. 4520-4528.

R.A. Soref, "Field effects in nematic liquid crystals obtained with interdigitated electrode", J. Appl. Phys. 45 (1974) 5466.

* cited by examiner

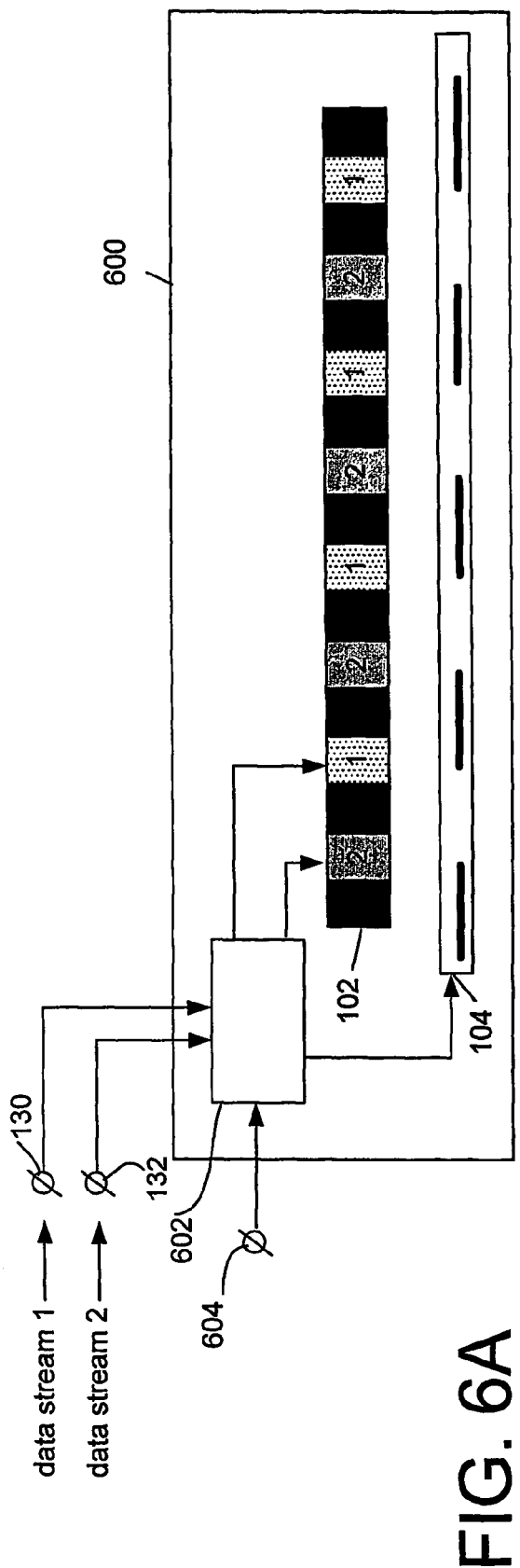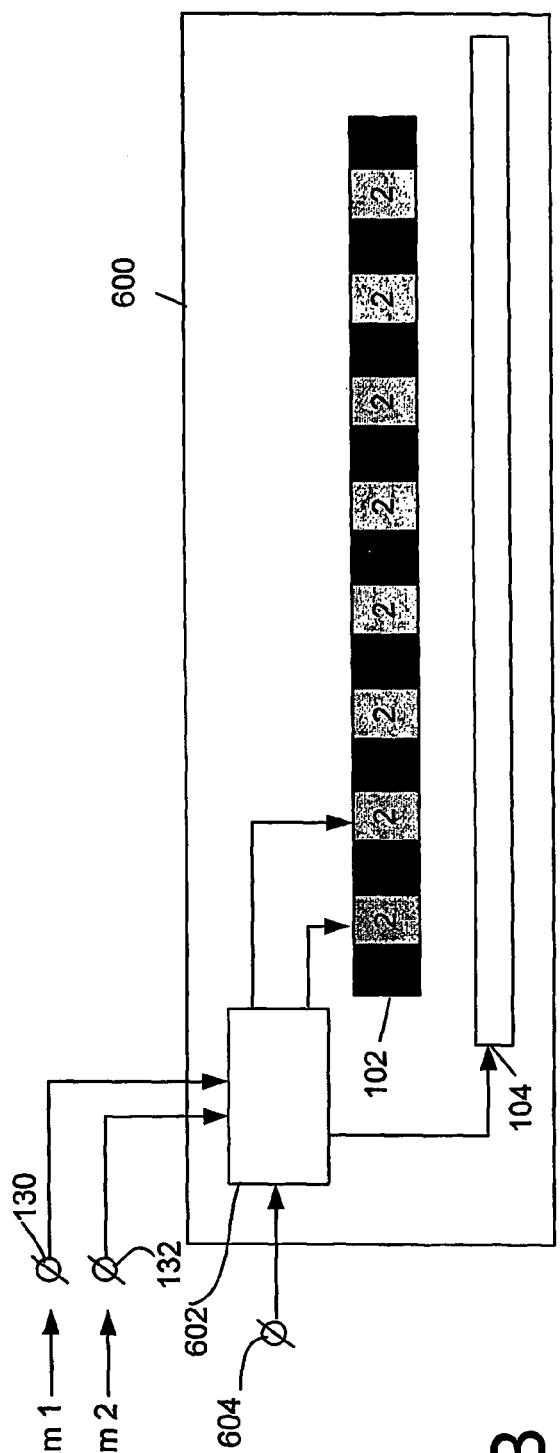

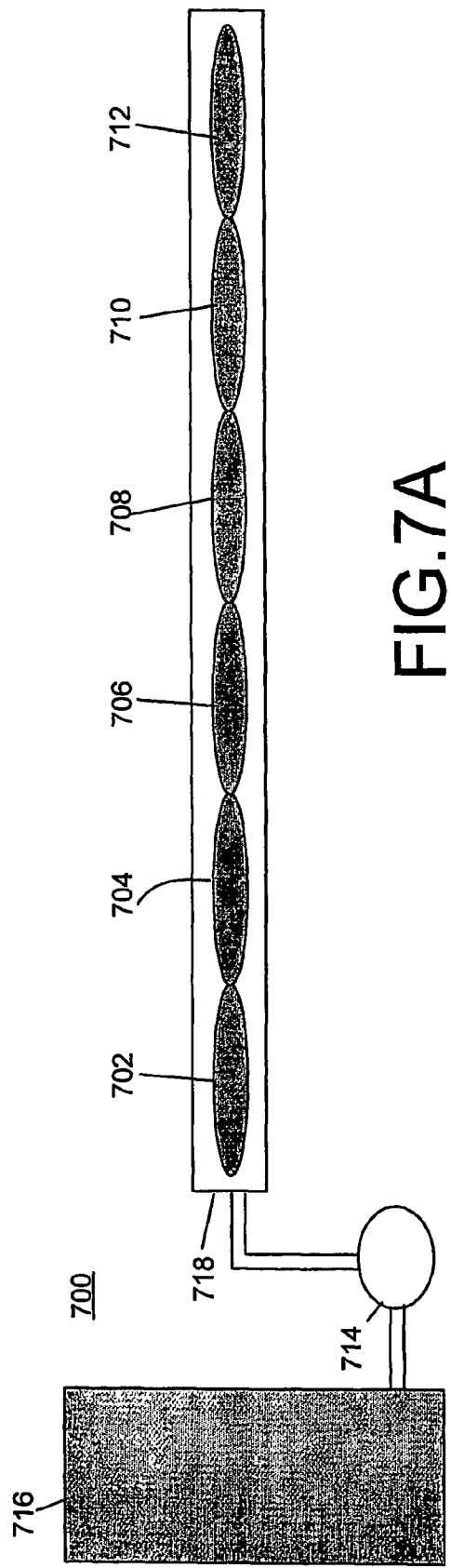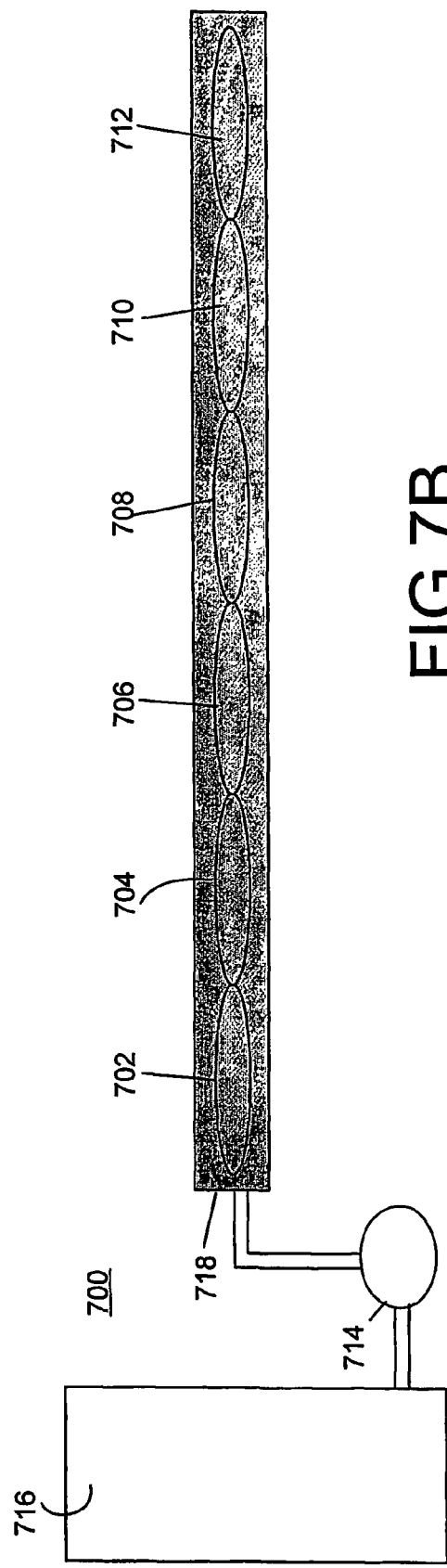
FIG.7A
FIG.7B

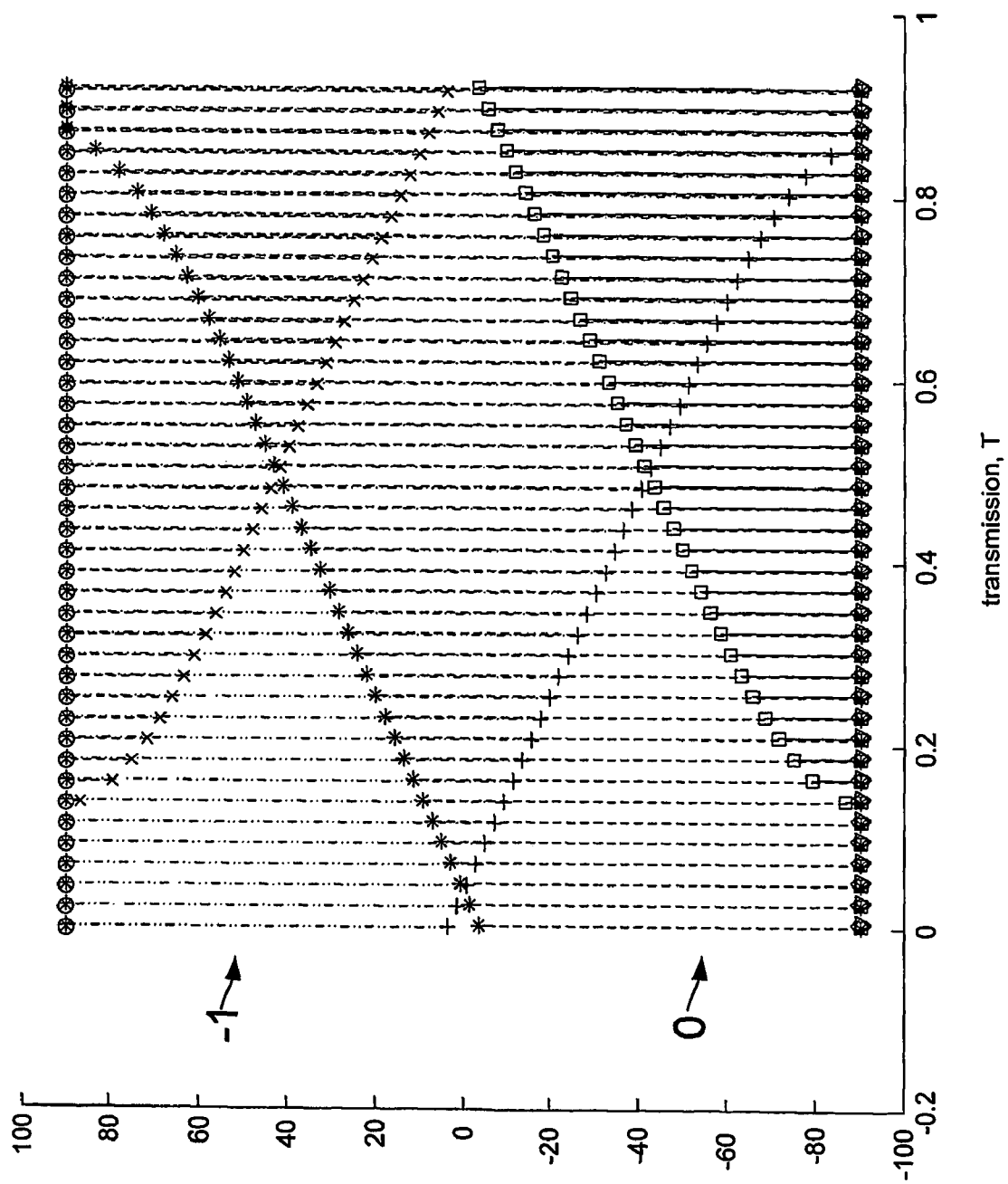

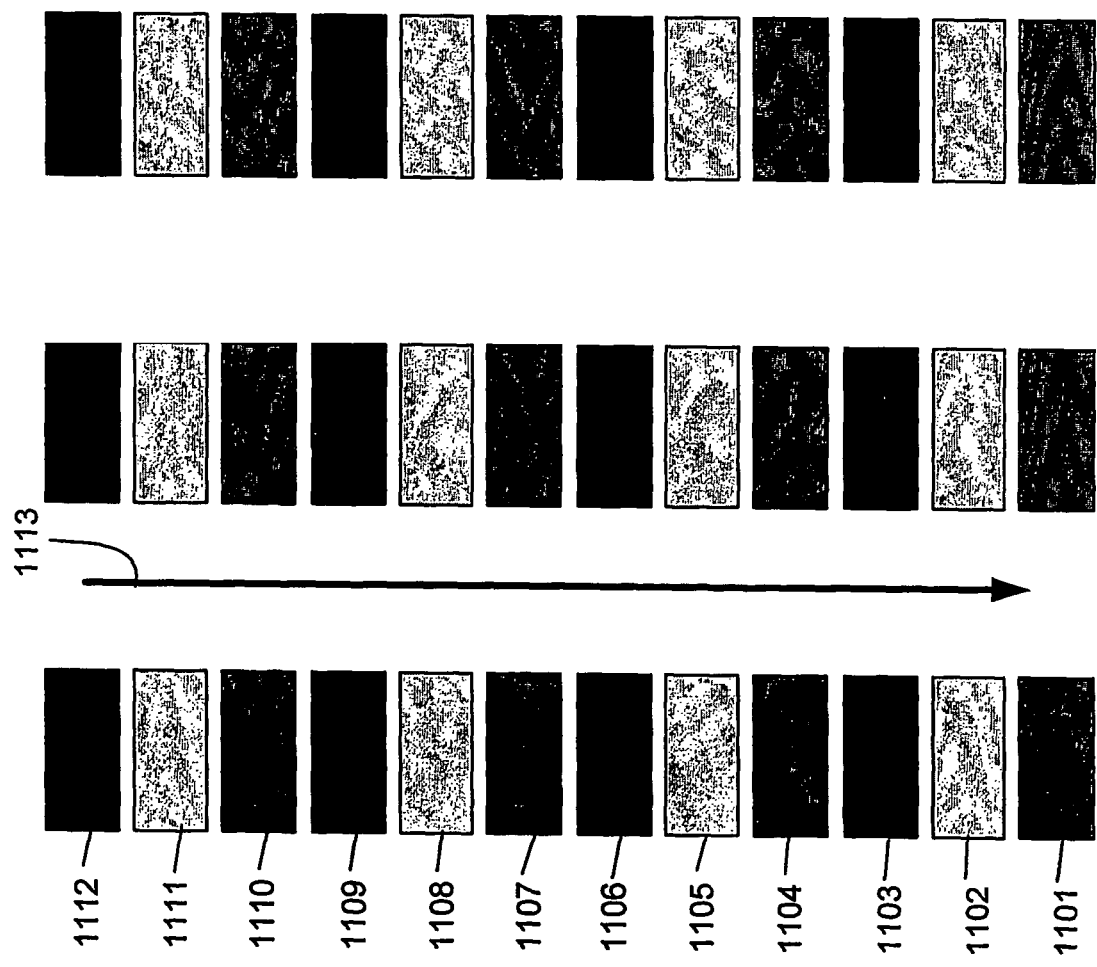

DISPLAY SYSTEM FOR DISPLAYING IMAGES WITHIN A VEHICLE

The invention relates to a display system for displaying images within a vehicle, and more particular to a display system which is arranged to display different images to multiple observers simultaneously. E.g. within the car environment the driver and the passenger may want to use a display situated in the dashboard in between the two of them. However, often the nature of information that they would like to visualize may be different. The driver prefers knowledge based information, e.g. driving or navigation information. The passenger may want more of entertainment based information, e.g. moving pictures or internet.

The invention further relates to a vehicle comprising such a display system for displaying images.

An embodiment of the display system of the kind described in the opening paragraph is known from WO98/09842. That system includes two display screens. One display screen is dedicated to displaying images for the driver of the vehicle while the second display screen is dedicated to displaying images for a passenger. The images on the two displays screens are generated independently of each other. The display screens preferably are mounted on frames that are movable relative to each other and the interior of the vehicle so that one screen is viewable to the driver and the other faces the passenger. A disadvantage of the system according to the prior art is that it is relatively large, i.e. the depth is relatively large.

It is an object of the invention to provide a display system of the kind described in the opening paragraph which is relatively thin.

This object of the invention is achieved in that the display system for displaying images within a vehicle, comprises:
- a display screen for generating a first one of the images and a second one of the images; and
- an optical selection screen for selectively passing the first one of the images in a first direction towards a first observer and passing the second one of the images in a second direction towards a second observer, the first and second observer being located inside the vehicle.

In the display system according to the invention there is one display screen being arranged to generate both the images for the first observer, e.g. a driver and the images for the second observer, e.g. a passenger which is seated adjacent to the driver. Preferably this display system is placed relatively close to the optical selection screen resulting in a relatively thin display system. An advantage of the limited depth is that it is easy to built the display system into the vehicle, i.e. it gives the designer much freedom. The limited depth makes the display system also look sophisticated resulting in a high-tech perception. That is a major aspect for the perceived quality.

It is known to apply stereo display systems for giving a 3D impression to an observer. These systems are designed to generate two views, i.e. two sets of images. In the case of stereo viewing the respective images of the two sets correspond to each other to form stereo pairs. The purpose is that one image out of each pair is seen by the left eye of the observer and that the other image out of each pair is seen by the right eye of the observer.

The application of this principle to a variety of displays has been considered in a large body of literature. For example in the proceedings of SPIE volumes 1256(1990), 1457(1991) and 1669(1992); in "Three-dimensional imaging systems: a new development" by Neil Davies, Malcolm McCormick and Li Yang, Appl. Optics vol. 27 no 21 pp4520-4528 (1988); and in "3D Worlds" by Malcolm McCormick and Neil Davies, in Physics World, Jun. (1992).

Besides the fact that the images being shown by a stereo display system form pairs there is another important aspect in the case of stereo viewing: the distance between the eyes of the observer is relatively small (7 cm on average) resulting in a relatively small angle between the direction in which the left image out of each pair is directed and the direction in which the right image out of each pair is directed.

The display system according to the invention is based on components of a stereo display system which is known in the field of 3D visualization. However there are major differences. First, the images to be visualized, do not form pairs of images. In other words the images to be shown to the first observer are independent from the images shown to the images shown to the second observer. Second, the dimensions of the elements of the display screen and of the optical selection screen are appropriate to achieve a relatively large angle between the first direction and the second direction. With elements of the display screen is meant the light elements for generating or modulating the light of the respective pixels of the first and second image. The light elements are arranged to generate light in the case of an active display screen comprising e.g. Organic Light Emitting Diodes (OLED) or Polymer Light Emitting Diodes (PolyLED). The light elements are arranged to modulate light in the case of a passive display screen comprising a back-light and e.g. Liquid Crystals (LCD). Alternatively the display screen is an Electro-chrome display or a ferroelectric display. With elements of the optical selection screen is meant the optical elements for partly obstructing the light from the display screen, i.e. like a barrier, or optical elements for bending the light from the display screen, e.g. lenses. Preferably cylindrical lenses are applied which are put in a vertical orientation.

Because of the differences it is not obvious that a skilled person working in the field of vehicle design applies components of a stereo display system to construct a display system which fulfills the requirements of multi-viewing in a vehicle. This statement is stressed by the fact that stereo displays systems exist for many years already but, to our knowledge of the prior art, there are no display systems in vehicles comprising one display screen for simultaneously generating both the first image for the first observer and the second image for the second observer.

In an embodiment of the display system according to the invention the optical selection screen comprises a number of bars and slits, the slits being arranged for passing the first one of the images in the first direction and for passing the second one of the images in the second direction and the bars being arranged to obstruct the first one of the images in the second direction and to obstruct the second one of the images in the first direction. An advantage of this embodiment according to the invention is that it is relatively easy to construct. Preferably the optical selection screen is a foil comprising transparent and non-transparent stripes, e.g. a transparent foil on which bars are painted or printed.

In an embodiment of the display system according to the invention the display screen comprises a number of light elements each having a first size and being disposed at a first distance from each other and wherein a size of a first one of the slits is substantially equal to a sum of the first size of a first one of the light elements and the first distance. An advantage of this embodiment according to the invention is that the amount of light corresponding to one of the images is relatively constant for a relatively large viewing angle.

That means that if an observer moves his head e.g. from left to right (or vice versa) then the appearance of the image regarding the luminance does not or hardly change. It should be noted that in stereo display systems the size of the slits in relation to the size and position of the light elements is typically much smaller.

In an embodiment of the display system according to the invention the display screen comprises a number of light elements, a first one of the light elements having a first size and a second size being smaller than the first size, a first one of the slits having a third size and a fourth size being smaller than the third size, the first one of the light elements being oriented with the first size substantially perpendicular relative to the third size of the first one of the slits. An advantage of this embodiment is that the viewing cones are relatively large, while triples of light elements corresponding to primary color components, red, green and blue are combined into combined light elements which are substantially square. In other words a set of rectangular shaped sub-pixels are combined into square pixels.

In an embodiment of the display system according to the invention the optical selection screen comprises a number of lenses for selectively passing the first one of the images in the first direction towards the first observer and passing the second one of the images in the second direction towards the second observer. An advantage of this embodiment according to the invention is that it is relatively easy to construct. Preferably the optical selection screen comprises a number of cylindrical lenses which have a length which substantially corresponds to the height of the display screen. Another advantage of this embodiment according to the invention is that most of the amount of light being produced by means of the display screen passes the optical selection screen, which is not the case if a barrier is used as optical selection screen. Besides lenses it is also possible to apply micro prisms to divert the light in two directions.

In an embodiment of the display system according to the invention the display screen comprises a number of light elements each having a first size and being disposed at a first distance from each other and wherein a second distance between a first one of the lenses to a first one of the light elements which belongs to the first one of the lenses is substantially different from a focal length of the first one of the lenses. Preferably the second distance is such that a black-spot adjacent to one of the light elements is included in the conical shape between a focal point of the lens and the physical borders of the lens. An advantage of this embodiment according to the invention is that the amount of light corresponding to one of the images is relatively constant for a relatively large viewing angle. That means that if an observer moves his head e.g. from left to right (or vice versa) then the appearance of the image regarding the luminance does not or hardly change. It should be noted that in stereo display systems light elements are typically located at or nearby focal points of the corresponding lenses.

In an embodiment of the display system according to the invention the display screen comprises a number of light elements, a first one of the light elements having a first size and a second size being smaller than the first size, a first one of the lenses having a third size and a fourth size being smaller than the third size, the first one of the light elements being oriented with the first size substantially perpendicular relative to the third size of the first one of the lenses. An advantage of this embodiment is that the viewing cones are relatively large, while triples of light elements corresponding to primary color components, red, green and blue are combined into combined light elements which are substantially square. In other words a set of rectangular shaped sub-pixels are combined into square pixels.

An embodiment of the display system according to the invention comprises receiving means for receiving positional information of the first observer and wherein the display screen is a passive display screen comprising a directed back-light being controlled on basis of the positional information of the first observer. By localizing the first observer it is possible to provide the first image with a much higher luminosity exactly in the place where he is located compared with a back-light which is diffuse. To localize the first observer it is preferred to use a head-tracker, e.g. based on cameras. Optionally the images acquired by means of the cameras can be applied for other purposes, e.g. for inspecting whether the driver is not falling asleep. Preferably the receiving means are arranged to receive information about the actual position of the eyes: eye-tracking. Optionally the eye-tracking unit provides information about the direction in which the observer is gazing. If it is detected that the observer is not gazing at the display system but e.g. to the road, then it is possible to switch of the back-light and/or to stop generating images for the observer. This is advantageous for a driver of the vehicle because in that case the driver is not disturbed by the light coming from the display system when he is no longer or temporarily not interested in the information being provided by means of the display system. In order to generate images for both observers at least two back-lights are required or the back-light with a bi-directional characteristic is required.

In an embodiment of the display system according to the invention the display screen is arranged to generate a third one of the images and the display screen comprises a switching unit to switch the optical selection unit from:
  a multi-view state of selectively passing the first one of the images in the first direction and passing the second one of the images in the second direction; to
  a single-view state of passing the third one of the images in the first direction and in the second direction.

This embodiment according to the invention is arranged to switch between multi-view and standard single view. The image resolution of the third image is twice the resolution of the first or second image. The same holds for the amount of light corresponding to the respective images. This is e.g. an advantage if a driver who is watching navigation information on a first resolution wants to look at a map at increased resolution. This might be because he wants to read the name of a particular street or building on the map.

In an embodiment of the display system according to the invention the optical selection screen comprises a number of bars which are designed to be switched between a transparent state and a non-transparent state. The advantage of this embodiment according to the invention is that it is relatively easy to construct. Preferably the bars are switched between the transparent state and the non-transparent state on basis of an electric or magnetic field. Switching on basis of an electric current is called electrochromic. Switching based on an electric field is often applied in LC plates and is called ferroelectric. Alternatively the switching is based on UV. That is called photochromic.

In an embodiment of the display system according to the invention the optical selection screen comprises a number of lenses being placed within a reservoir in which a liquid having a first refractive index which is substantially equal to a second refractive index of a material of the lenses, can be put and drawn off to switch the optical selection unit between the single-view state and the multi-view state, respectively. An advantage of this embodiment according to the invention is that it is relatively easy to construct. Preferably the optical selection screen comprises a number of cylindrical lenses which have a length which substantially corresponds to the height of the display screen. Another advantage of this embodiment according to the invention is that most of the amount of light being produced by means of the display screen passes the optical selection screen, which is not the case if a barrier is used as optical selection screen.

It is another object of the invention to provide a vehicle of the kind described in the opening paragraph comprising a display system which is relatively thin.

This object of the invention is achieved in that the vehicle comprises the display system for displaying images, as claimed in claim 1.

Modifications of display system and variations thereof may correspond to modifications and variations thereof of the vehicle described.

Figure 2A:
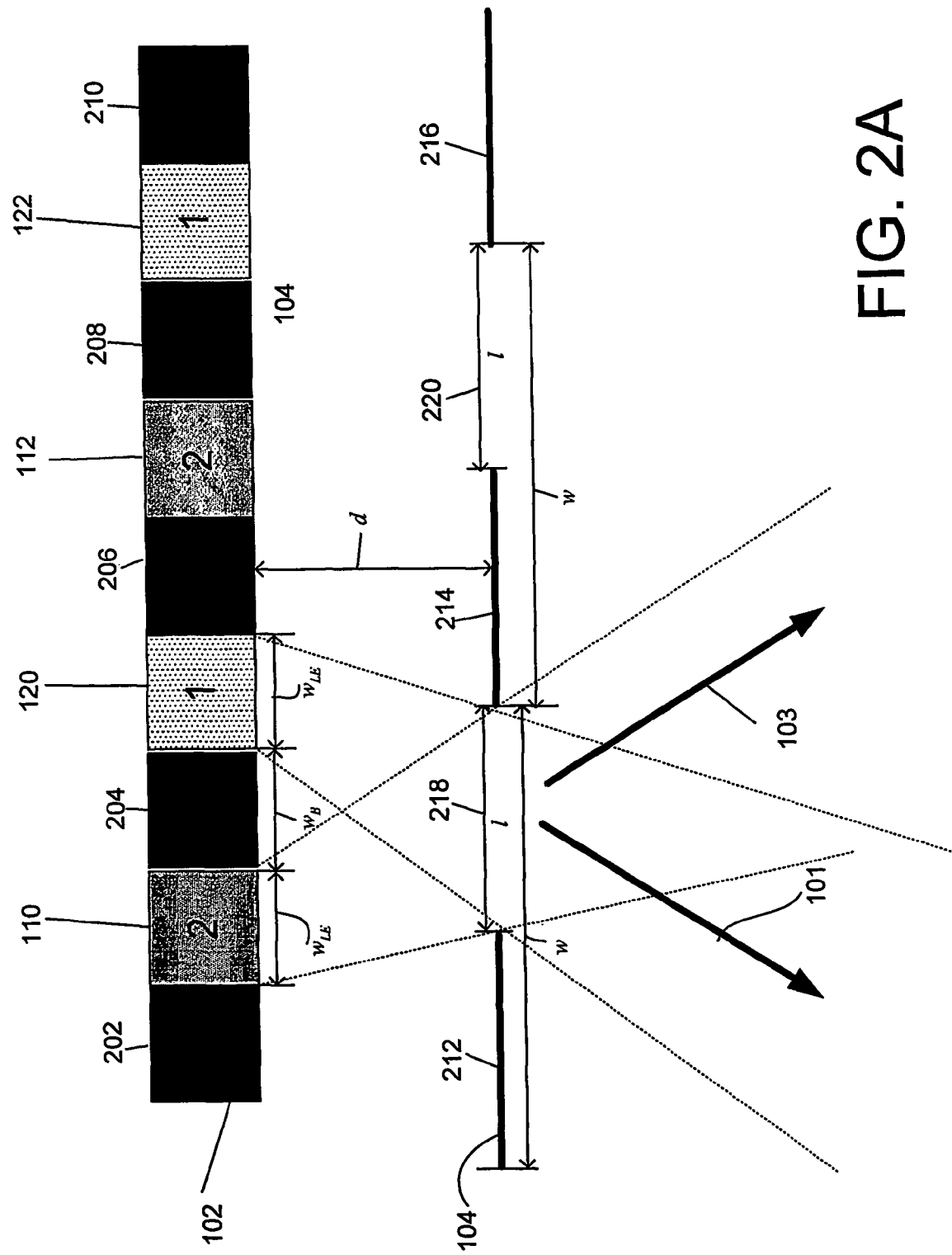
Figure 2B:
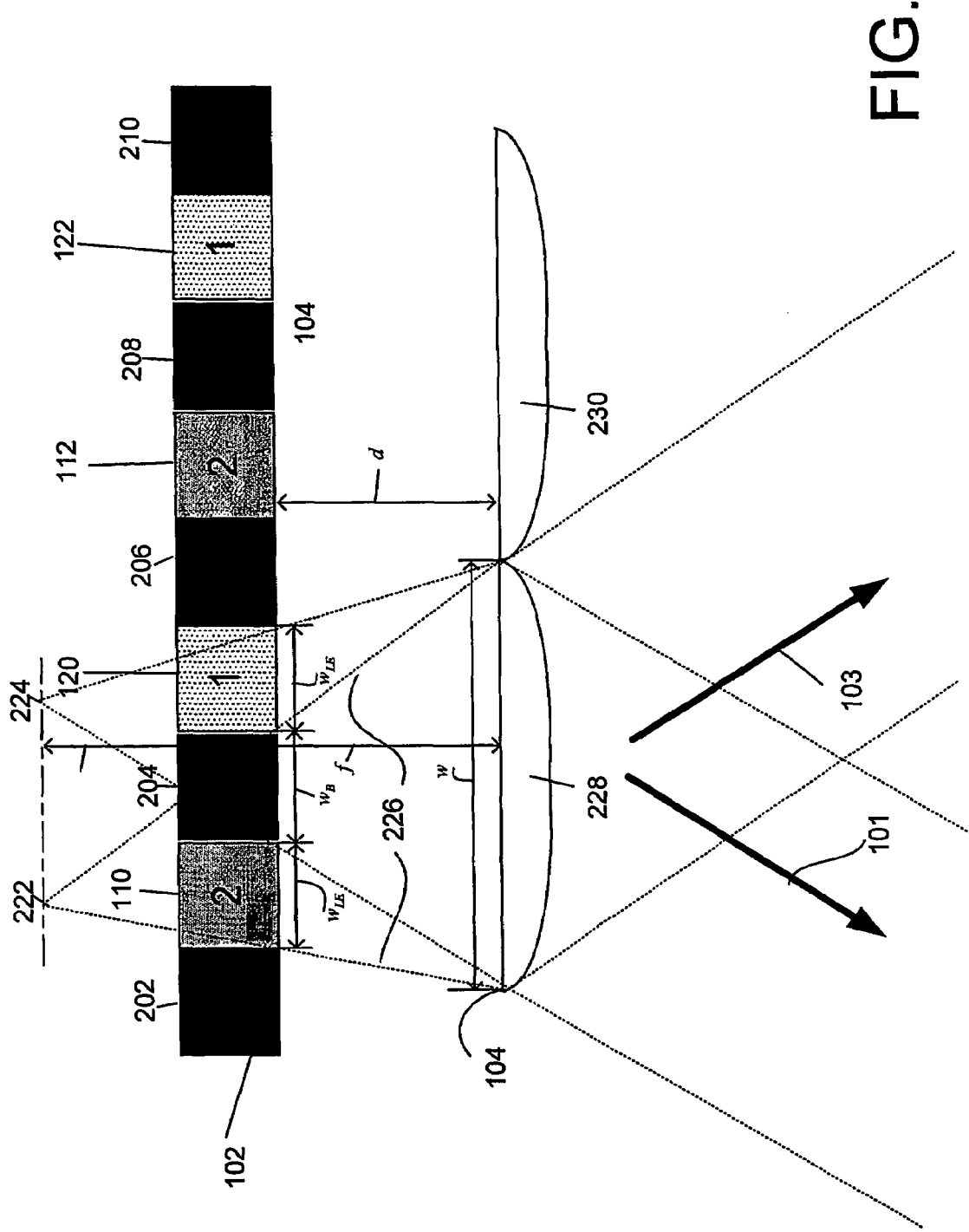
Figure 3:
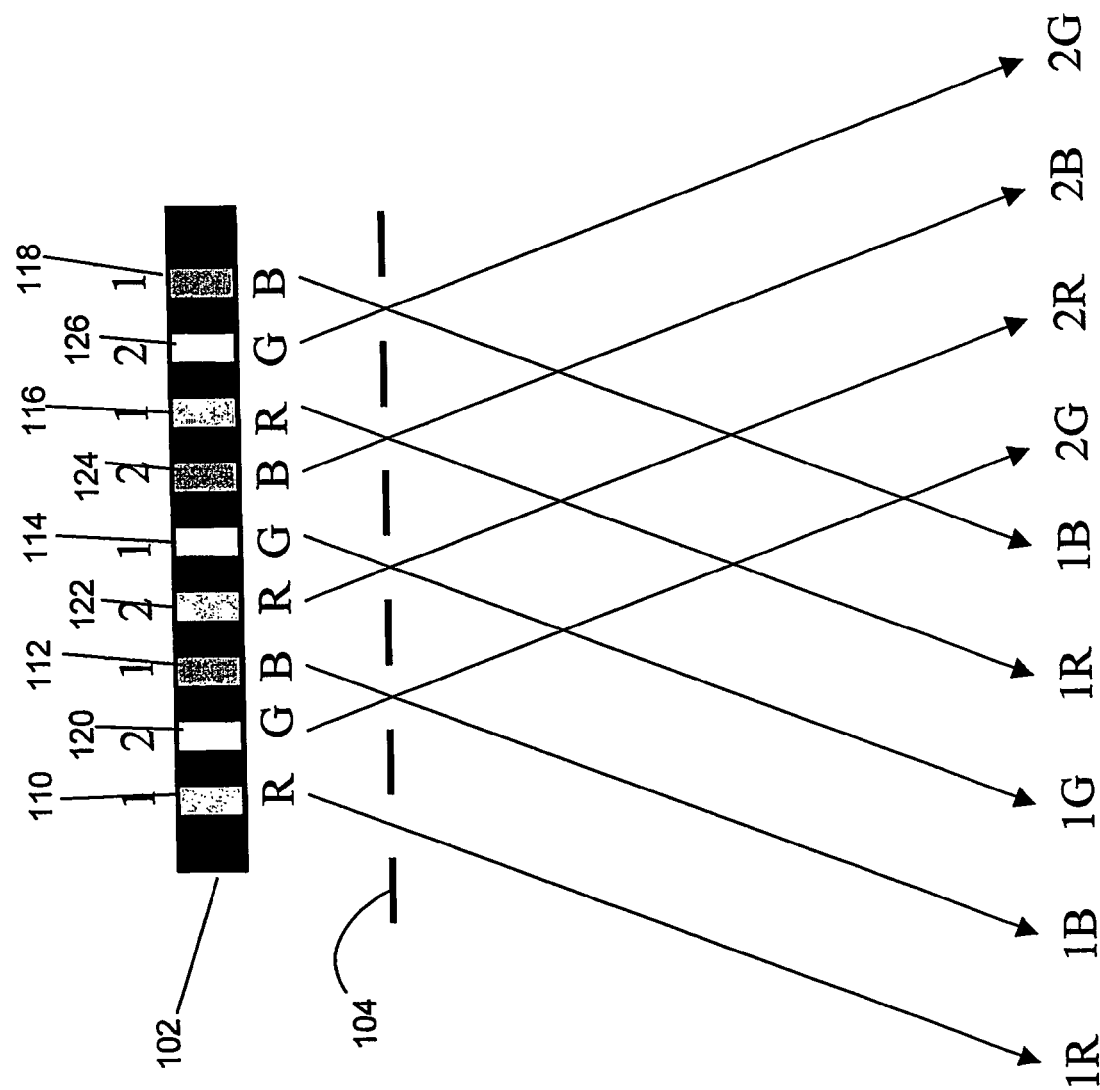
Figure 4:
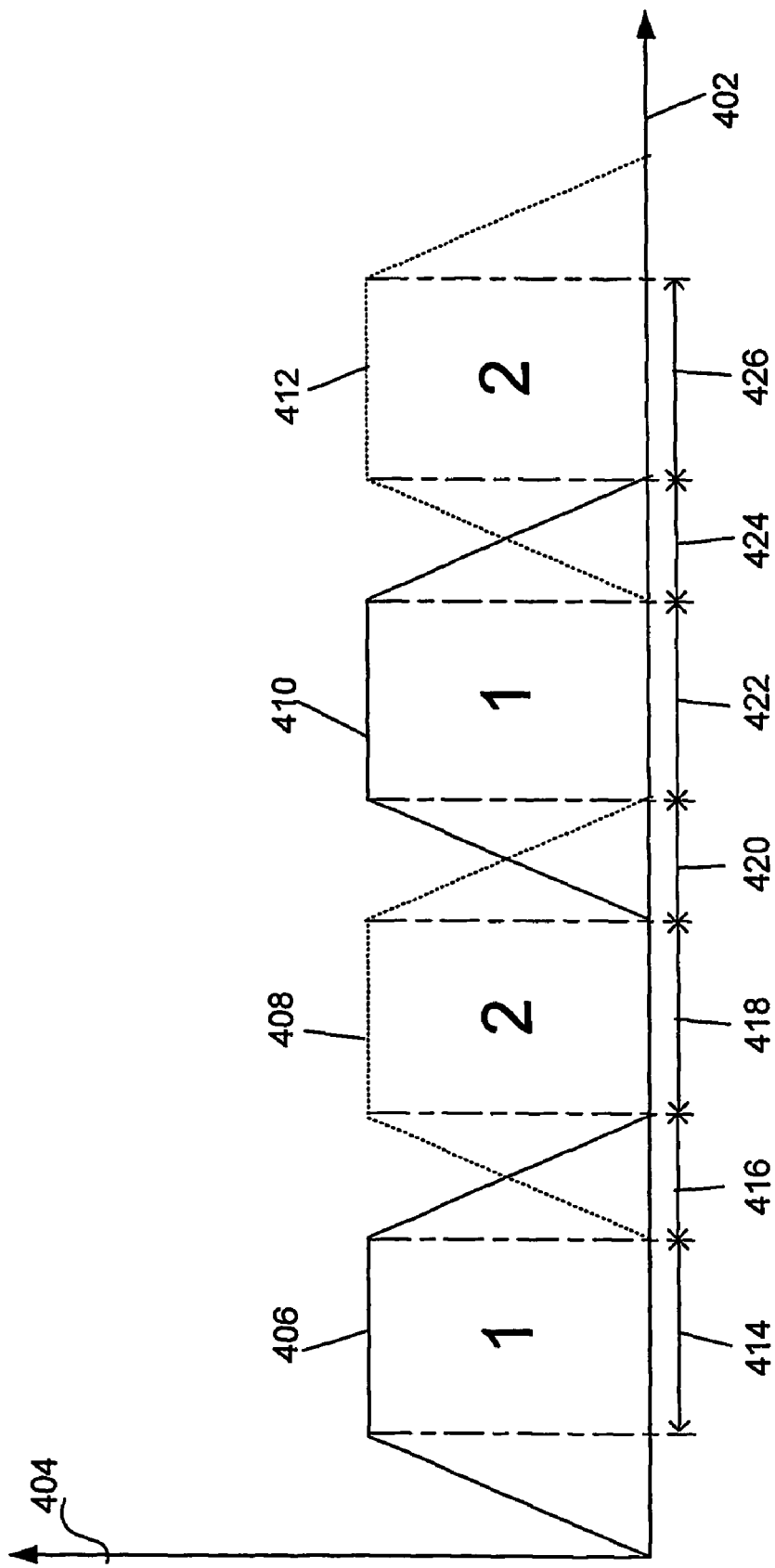

These and other aspects of the display system and of the vehicle according to the invention will become apparent from and will be elucidated with respect to the implementations and embodiments described hereinafter and with reference to the accompanying drawings, wherein:

FIG. 1 schematically shows an embodiment of the display system according to the invention;

FIG. 2A schematically shows an embodiment of the display system comprising an optical selection screen based on an optical barrier;

FIG. 2B schematically shows an embodiment of the display system comprising an optical selection screen based on lenses;

FIG. 3 schematically shows an embodiment of the display system comprising a color matrix display as display screen;

FIG. 4 schematically shows the observed views as function of viewing position for the display system according to FIG. 2A.

Figure 5:
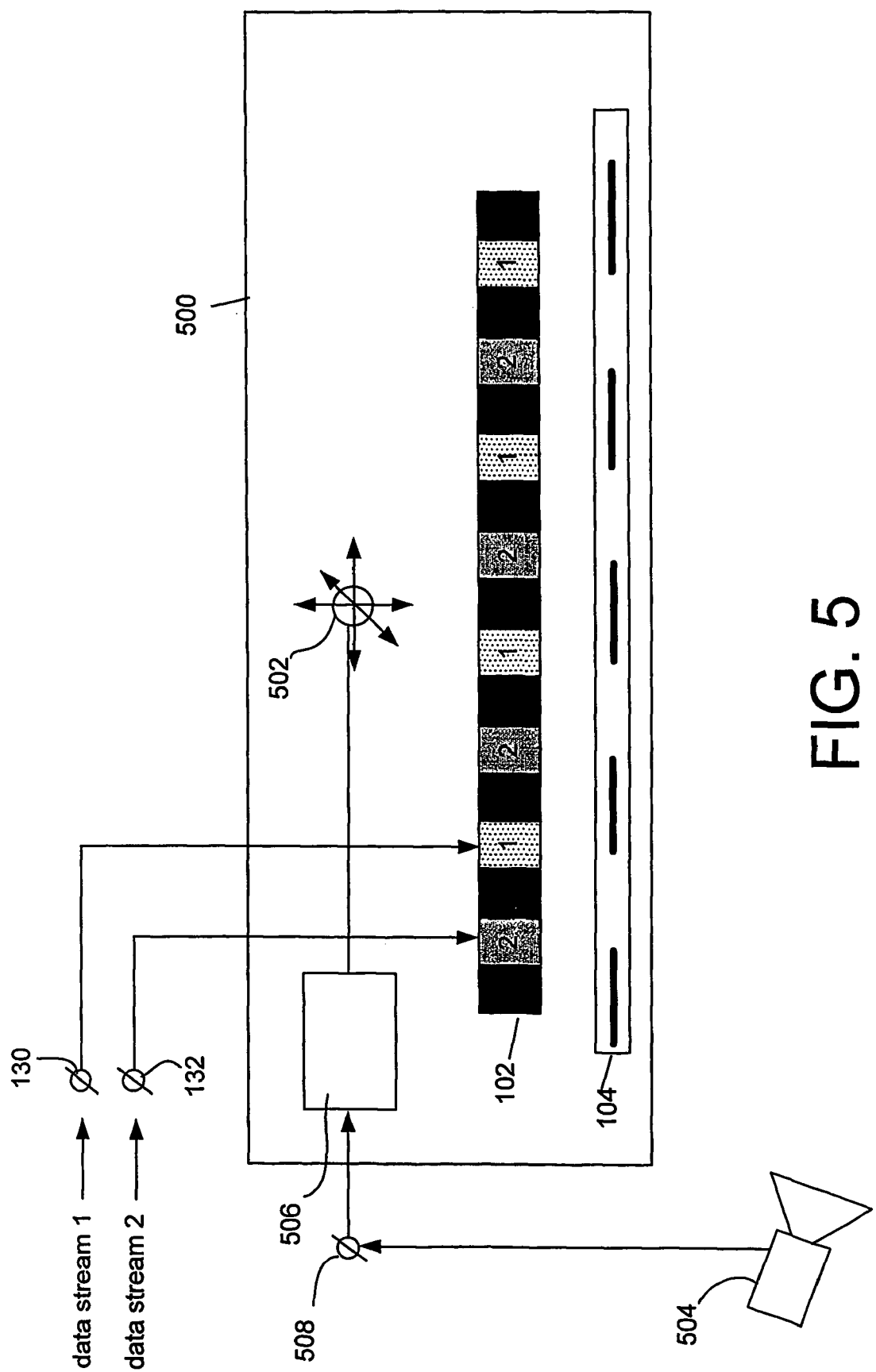
Figure 8:
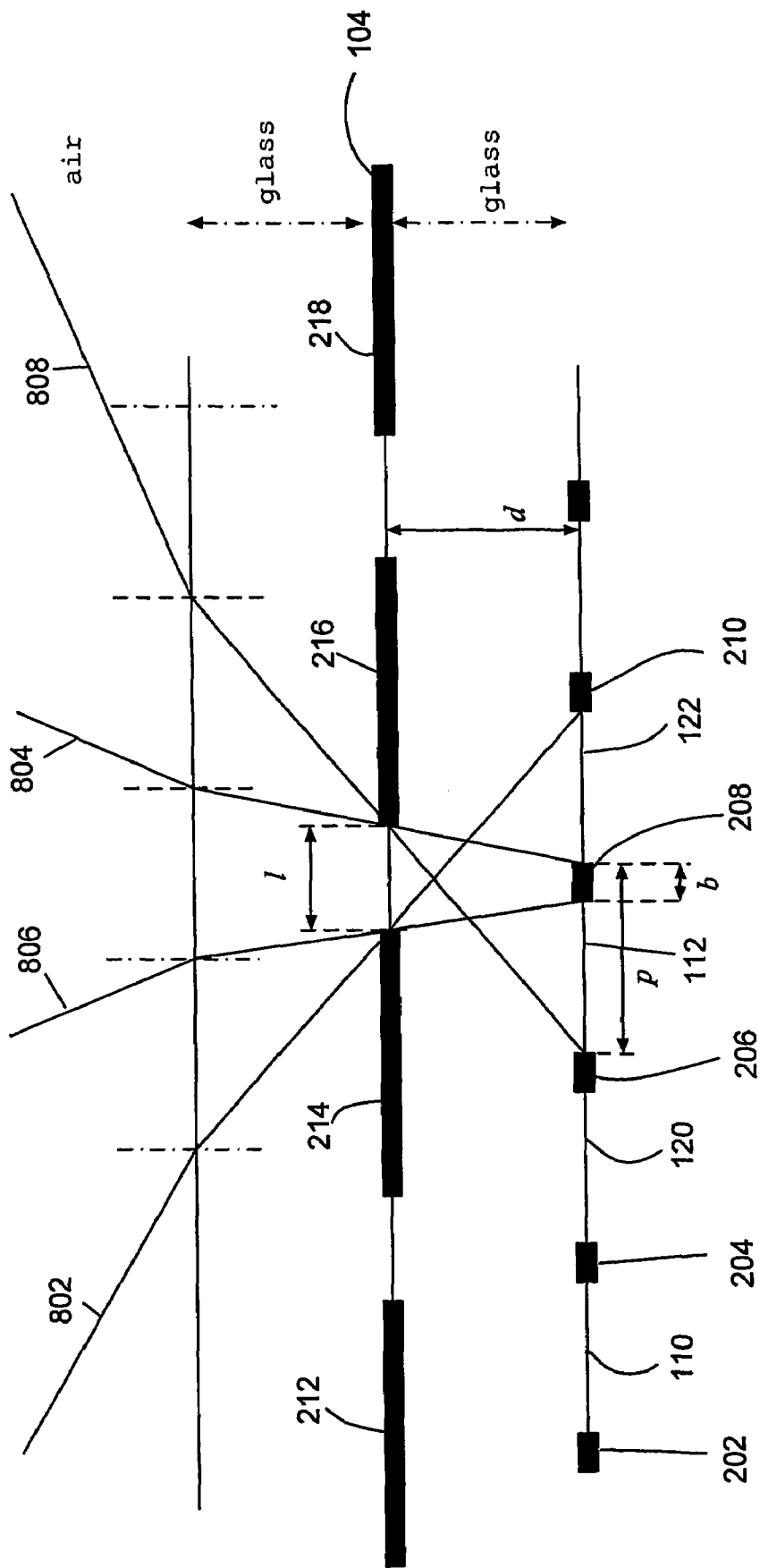
Figure 9A:
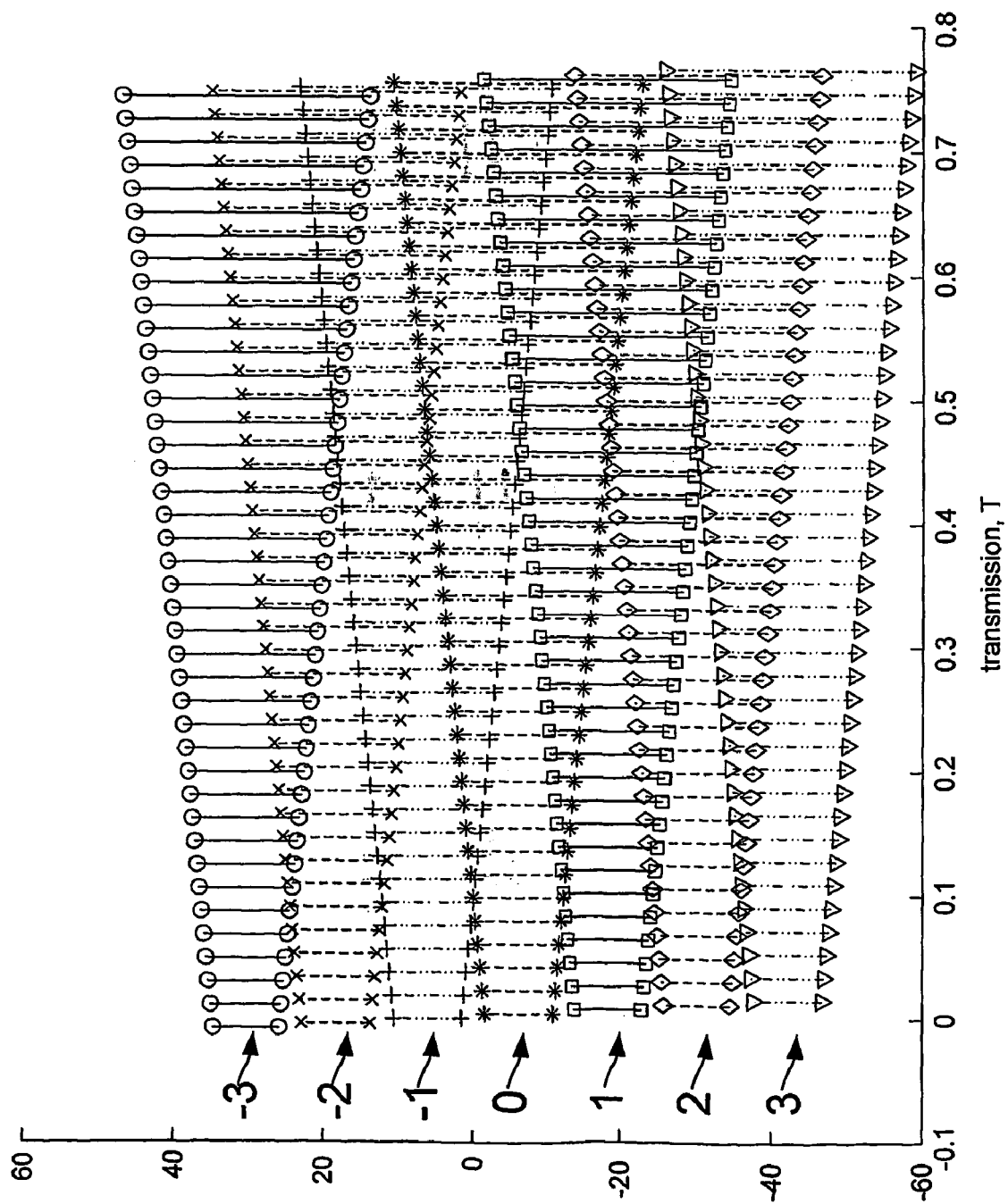
Figure 9B:
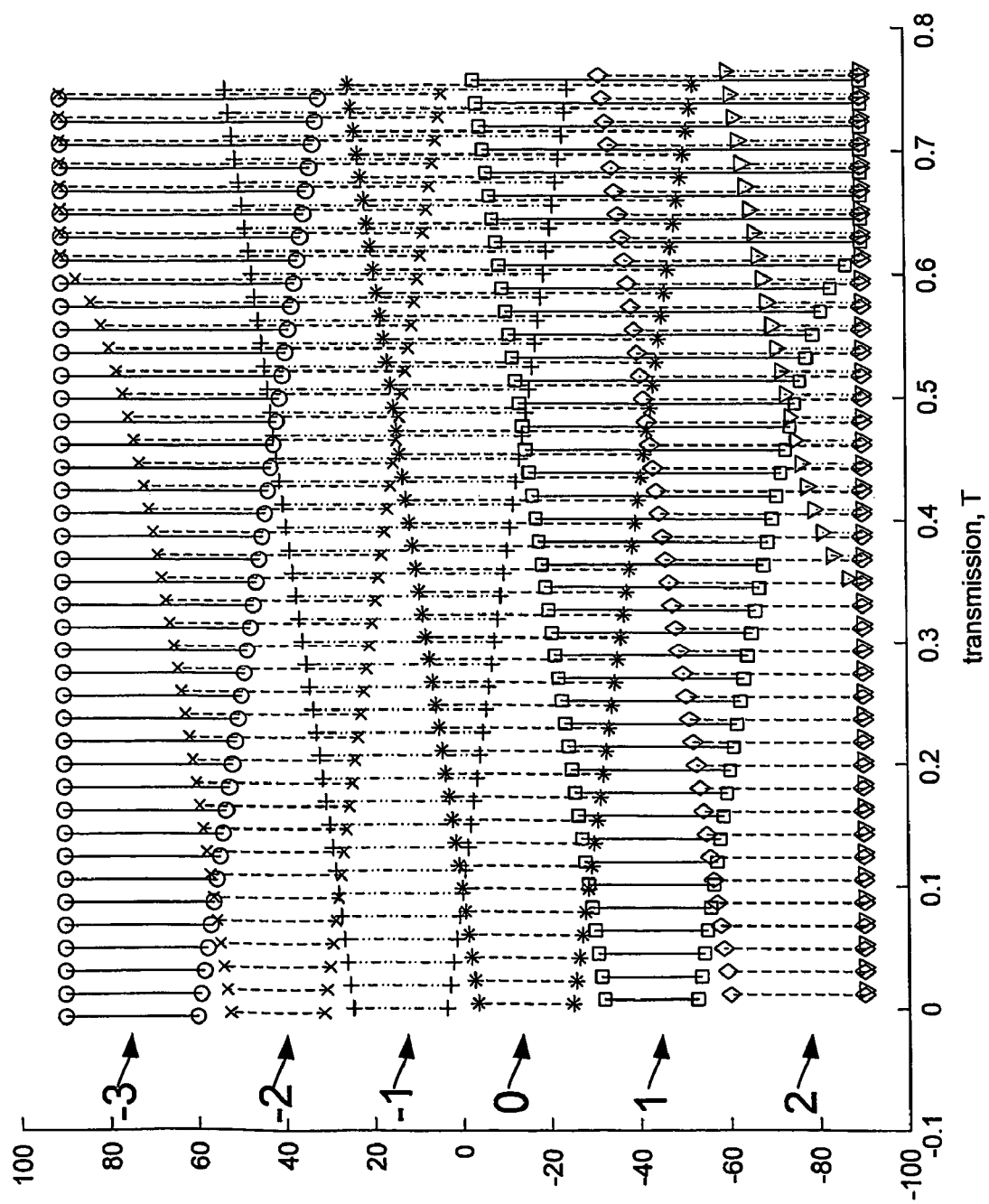
Figure 9C:
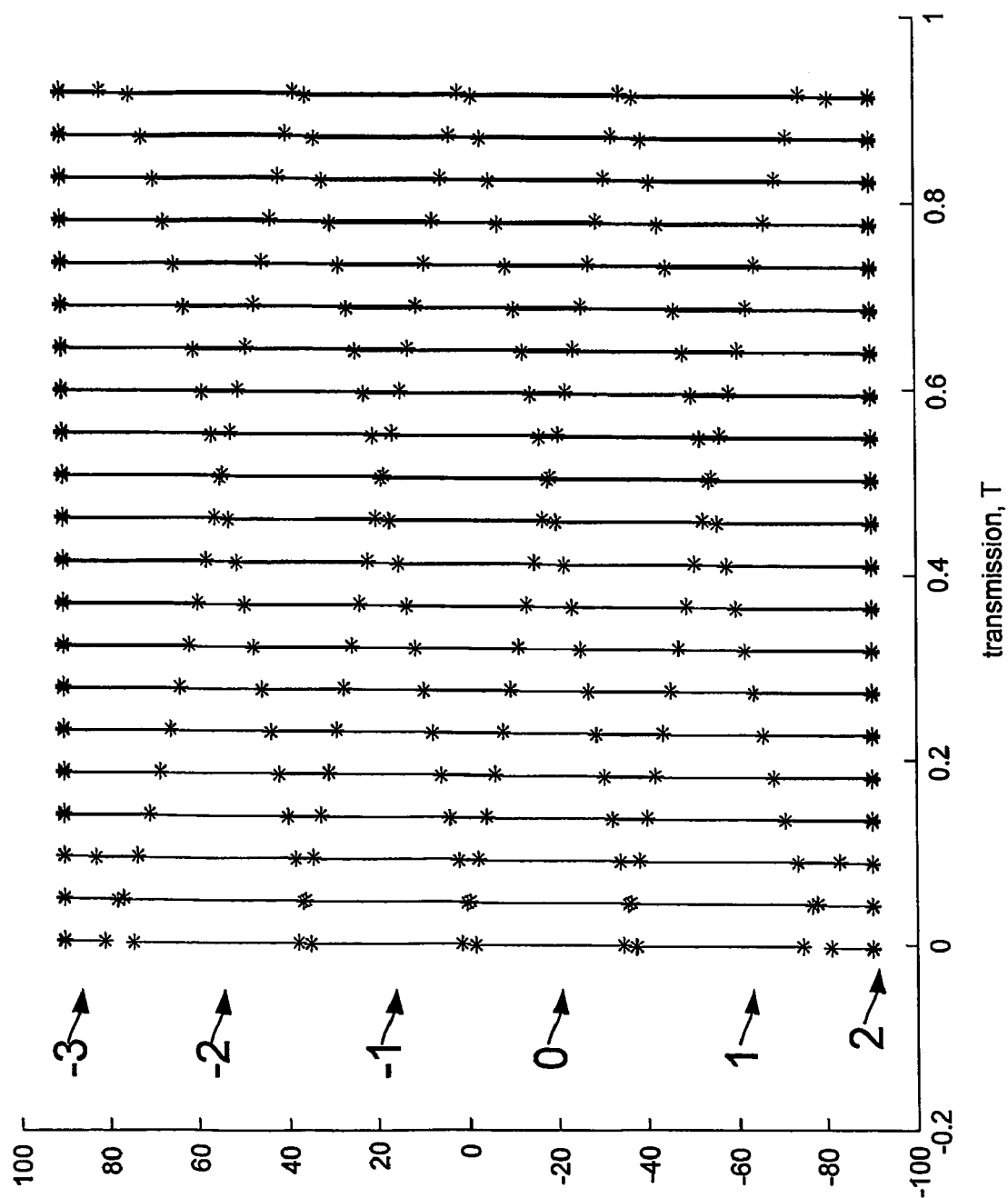
Figure 10:
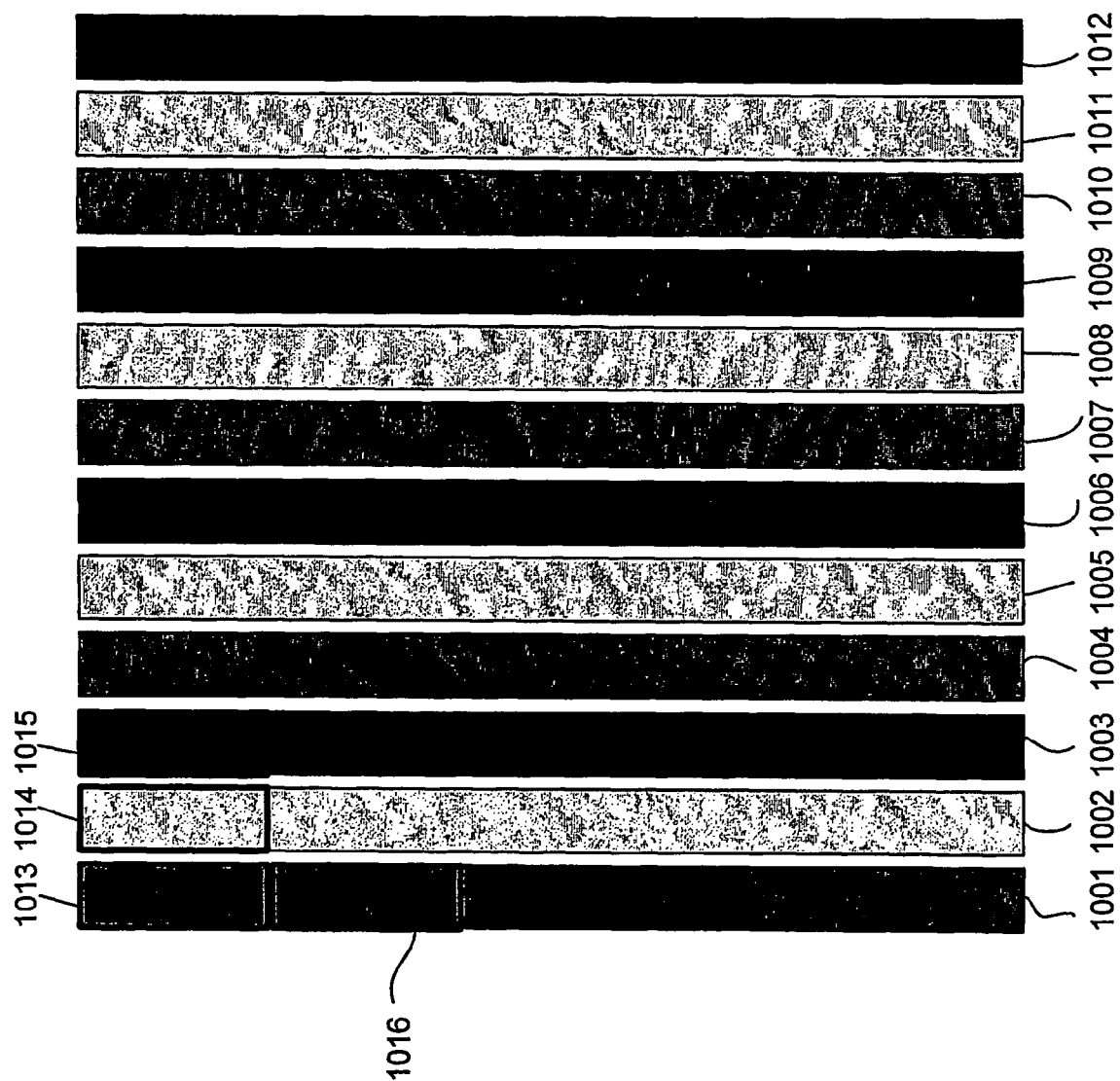

FIG. 5 schematically shows an embodiment of the display system comprising a directed back-light;

FIG. 6A schematically shows the multi-view state of an embodiment of the display system which is arranged to switch between a multi-view state and a single-view state;

FIG. 6B schematically shows the single-view state of an embodiment of the display system which is arranged to switch between a multi-view state and a single-view state;

FIG. 7A schematically shows the multi-view state of an embodiment of the optical selection screen of a display system which is arranged to switch between a multi-view state and a single-view state;

FIG. 7B schematically shows the single-view state of an embodiment of the optical selection screen of a display system which is arranged to switch between a multi-view state and a single-view state;

FIG. 8 schematically shows the geometry of two viewing cones;

FIG. 9A schematically shows the viewing angles for a glass thickness d=700 μm, a pixel width p=100 μm and a black-spot size b=25 μm;

FIG. 9B schematically shows the viewing angles for a glass thickness d=300 μm, a pixel width p=100 μm and a black-spot size b=25 μm;

FIG. 9C schematically shows the viewing angles for a glass thickness d=700 μm, a pixel width p=300 μm and a black-spot size b=25 μm;

FIG. 9D schematically shows the viewing angles for a glass thickness d=300 μm, a pixel width p=300 μm and a black-spot size b=25 μm;

FIG. 10 schematically shows the pixel structure and color filter layout used in a standard LCD; and FIG. 11 schematically shows the pixel structure relative to the optical selection screen.

Same reference numerals are used to denote similar parts throughout the Figs.

FIG. 1 schematically shows an embodiment of the display system 100 according to the invention, comprising:
- a display screen 102 for generating a first series of images and a second series of images; and
- an optical selection screen 104 for selectively passing the first series of images in a first direction 101 towards a first observer 106 and passing the second series of images in a second direction 103 towards a second observer 108.

At the first input connector 130 of the display system a first data stream 1 is provided and at the second input connector 132 of the display system 100 a second data stream 2 is provided. The first and second data stream 1,2 might e.g. correspond to navigational information, movies, Web-pages of internet, games. The first and second data stream 1,2 are provided to the display screen 102 which is arranged to convert the data streams 1,2 into a first series of images and a second series of image, respectively. The display screen 102 comprises a number of light elements 110,128 which are equidistantly disposed. A first group 120,128 of these light elements is arranged to generate the first series of images on basis of the first data stream 1 and a second group 110,118 of these light elements is arranged to generate the second series of images on basis of the second data stream 2. The first group 120, 128 of these light elements correspond e.g. to the light elements of the odd columns of light elements and the second group 110,118 of these light elements correspond e.g. to the light elements of the even columns of light elements.

The optical selection screen 104 of FIG. 1 is based on a barrier. Light from each light element of the first group 120,128 of the light elements is partly obstructed by bars of the barrier. The result is that light does not reach the second observer 108 which is located at a second location. Another part of the light of each light element of the first group 120,128 of the light elements passes the optical selection screen 104 via the slits between the bars. This light is visible to the first observer 106 which is located at a first location. Light from each light element of the second group 110,118 of the light elements is also partly obstructed by bars of the barrier. However, this results in that light does not reach the first observer 106 which is located at the first location. Another part of the light of each light element of the second group 110,118 of the light elements passes the optical selection screen 104 via the slits between the bars. This light is visible to the second observer 108 which is located at the second location.

The first and second observer 106,108 are located inside a vehicle, e.g. a car, train, bus, boat or airplane. The observers might be both passengers. It might also be that one of the observers is a passenger and the other observer is driving the vehicle. Besides that it is possible that both observers are controlling the vehicle like in an airplane.

FIG. 2A schematically shows an embodiment of the display system comprising an optical selection screen 104 based on an optical barrier. The optical selection screen 104 comprises a number of bars 212-216 and slits 218-220, the slits 218-220 being arranged for passing the first series of images in the first direction 101 and for passing the second series of images in the second direction 103 and the bars 212-216 being arranged to obstruct the first series of images in the second direction 103 and to obstruct the second series of images in the first direction 101. The display screen 102 comprises a number of light elements 110, 112 for generating light corresponding to the respective pixels of the second series of images and a number of light elements 120, 122 for generating light corresponding to the respective pixels of the first series of images. Each light element 110, 112, 120, 122 has a first size $w_{LE}$ and is disposed at a first distance $W_B$ from its neighboring light element 110, 112, 120, 122. In other words there are black-spots 202-210 in between the light elements 110, 112, 120, 122. The size l of a first one of the slits 218 is substantially equal to a sum of the first size $w_{LE}$ of a first one of the light elements 110 and the first distance $W_B$. See equation 1:

$$l \approx w_{LE} + w_B \quad (1)$$

The distance d between the display screen 102 and the optical selection screen, and the size l of a first one of the slits 218 are substantially mutually equal. See equation 2:

$$l \approx d \quad (2)$$

However a lower value of d to achieve a larger viewing angle is also possible: l>d The following Equation also applies.

$$w \approx 2l \quad (3)$$

This embodiment according to the invention has a relatively large viewing angle which makes the display system very appropriate for application in a car where the observers are seated relatively far from each other, related to their distance to the display system. Besides that, the optical separation of the first series of images and the second series of images is relatively well. See also FIG. 4.

FIG. 2B schematically shows an embodiment of the display system comprising an optical selection screen 104 based on lenses 228, 230 for selectively passing the first series of images in the first direction 101 towards the first observer 106 and passing the second series of images in the second direction 103 towards the second observer 108. The display screen 102 comprises a number of light elements 110, 112 for generating light corresponding to the respective pixels of the second series of images and a number of light elements 120, 122 for generating light corresponding to the respective pixels of the first series of images. Each light element 110, 112, 120, 122 has a first size $w_{LE}$ and is disposed at a first distance $W_B$ from its neighboring light element 110, 112, 120, 122. The distance d between a first one of the lenses 228 to a first one of the light elements 110 which is aligned with the first one of the lenses 228 is substantially different from a focal length f of the first one of the lenses 228. This distance d is such that most of a black-spot 204 adjacent to one of the light elements 110 is included in the conical shape 226 between a focal point 222 of the lens 228 and the physical borders of the lens 228. Besides that most of the black-spot 204 adjacent to another light element 120 is included in the conical shape between another focal point 224 of the lens 228 and the physical borders of the lens 228. By "including" the black-spots 202-210 a wide viewing angle is achieved with a substantially constant strength of the received image.

FIG. 3 schematically shows an embodiment of the display system comprising a color matrix display as display screen 102. The color matrix display comprises a number of red, green and blue light generating light elements 112-126 which are disposed in a configuration which is standard for color matrix displays: as triples of RGB light elements being separated by black-spots. The control of the color matrix display is such that neighboring light elements receive data from different data streams 1,2. It can be clearly seen that because of the optical separation by the optical selection screen 104 new triples of RGB rays are formed.

FIG. 4 schematically shows the observed views as function of viewing position for the display system according to FIG. 2A. The x-axis 402 corresponds with the viewing position, i.e. the location of the observer. The y-axis 404 corresponds with the strength of the received view, i.e. images. For a first 414 range of positions of the observer only images of the first series, corresponding to the first data stream, can be received. For all these positions the strength of the first view is the same. That can be derived from the fact that curve 406 is flat corresponding to the first 414 range of positions. In the second 416 range of positions both images of the first series and images of the second series can be received. In the first part of the second range 416 the strength of the first view is higher than the strength of the second view. In the second part of the second range 416 the strength of the first view is lower than the strength of the second view. In the third 418 range of positions only images of the second series, corresponding to the second data stream, can be received. In the fourth 420 range of positions both images of the first series and images of the second series can be received. For the fifth 422 range of positions of the observer only images of the first series can be received. Etcetera. Notice that if the images are homogeneous, i.e. all pixels have the same luminance value, then the strength of the received view matches with the amount of received light.

FIG. 5 schematically shows an embodiment of the display system 500 according to the invention comprising a directed back-light 502. Besides the two input connectors 130,132 for receiving data streams 1,2, representing images to be generated the display system 500 comprises an input connector 508 at which positional information of the observer is provided. This positional information is calculated by means of a head-tracker 504. Preferably the head-tracker comprises a video camera 504. Alternatively the head-tracker is based on ultra-sound, on an Electro-magnetic field or on infrared. The display system 500 comprises a receiving unit 506 for receiving the positional information and for calculating the appropriate location of the directed back-light on basis of the positional information. In FIG. 5 it is depicted with arrows that the directed back-light has three degrees of freedom: translation over three axes. Alternatively the directed back-light is not physically moved but used is made of a structure of multiple light sources which are switched on or off on basis of the positional information. That might be based on a technique called "in-plane switching" as described in the article "Dynamic contrast filter to improve the luminance contrast performance of cathode ray tubes", by H. de Koning et al. in IDW2000 Proceedings of 7th International Display Workshop. It works as follows. A light source is located at an edge of a particular sheet to lead in light in the particular sheet and which light is emitted at a particular location of the particular sheet which corresponds with the required location of the directed back-light, towards the optical selection screen 104. The light passes along the particular sheet like in a glass-fiber. At the particular location the material is made diffuse temporarily. As a result the light will exit the sheet at that particular location. The advantage of an embodiment based on that technique is that the power consumption can be decreased.

Other articles describing this technique are: "Preparation of alphanumeric liquid crystal displays with liquid crystals", SID, by S. Kobayashi, in International Symposium, San Francisco (USA) (1972), Digest of Technical Papers III 68 and "Field effects in nematic liquid crystals obtained with an interdigitated electrode" by R. A. Soref, in J. Appl. Phys. 45 (1974) 5466. Another technique which can be applied is called "Multi-domain Vertically Aligned LC", where the advantage is the direct use of the switchable transparent/non-transparent additional LC layer which working concept is based on the ferroelectric effect. This technique is described in the articles "Homeotropic alignment full color LCD" by S. Yamauchi, M. Aizawa, J. F. Clerc, T. Uchida and J. Duchene, in SID International Symposium, Baltimore (USA) (1989), Digest of Technical Papers XX 378 and "Highly multiplexed super homeotropic LCD" by J. F. Clerc, M. Aizawa, S. Yamauchi and J. Duchene, in Proceedings of the 9th International Display Research, Japan Display, Kyoto (Japan)(1989) 188.

Although only one back-light 502 is depicted it will be clear that the display system 500 might comprise multiple back-lights. That means at least one back-light for each observer. The display screen 500 is a passive display screen, e.g. a LCD, acting as a spatial light modulator. In FIG. 5 is depicted that the display screen 102 is placed in between the back-light 502 and the optical selection screen 104. However, alternative configurations are possible too. E.g. a display system with the optical selection screen 104 disposed in between the back-light 502 and the optical selection screen. The optical selection screen 104 as depicted in FIG. 5 is based on a barrier. However the optical selection screen 104 can also be based on lenses.

FIG. 6A schematically shows the multi-view state of an embodiment of the display system 600 which is arranged to switch between a multi-view state and a single-view state. The display system 600 comprises an input connector 604 to provide the system with a trigger to switch from one state to the other state. This switching might be based on an explicit command of an observer but it might also be based on an automatically generated pulse. Such automatic pulse can e.g. be generated if the system is in multi-view state but only one of the sensors in the seats of the drivers signals the presence of an observer. In a more sophisticated set-up there might be a eye-tracking system which signals that one of the observer is not watching the display device.

In FIG. 6A it can be seen that the data streams 1 and 2 are both received and provided to the display screen 102. It is depicted that the subsequent light elements of the display screen 102 alternatingly process one of the two data streams 1 or 2. That means that e.g. the light element in the odd columns of the display screen 102 generate the light for the respective pixels of the images corresponding to data stream 1 and the light element in the even columns of the display screen 102 generate the light for the respective pixels of the images corresponding to data stream 2. The optical selection screen 104 is put in a state of selectively passing the images corresponding to data stream 1 in the first direction and passing the images corresponding to data stream 2 in the second direction. In connection with FIGS. 1, 2A and 2B the working of such optical selection screen 104 is described.

The multi-view state might e.g. be used in a car to show navigational information to the driver and entertainment information to the passenger sitting adjacent to the driver. Preferably the car comprises loudspeakers nearby their respective observers. In that way the driver is substantially provided with only the audio belonging to the navigational information and the passenger is substantially provided with only the audio belonging to the entertainment information. Alternatively there are audio direction means to direct the sounds corresponding to the different data streams 1,2 to the respective observers.

FIG. 6B schematically shows the single-view state of an embodiment of the display system 600 which is arranged to switch between a multi-view state and a single-view state. Or in other words, FIG. 6B schematically shows the single-view state of the embodiment of the display system 600 which is also depicted in FIG. 6A. In FIG. 6B it can be seen that the data streams 1 and 2 are both received but that only one of the data streams 2 is actually provided to the display screen 102. It is depicted that the subsequent light elements of the display screen 102 process only data streams 2. That means that e.g. the light element in both the odd columns and the even columns of the display screen 102 generate the light for the respective pixels of the images corresponding to data stream 2. The optical selection screen 104 is put in a state of passing the light in all directions. The optical selection screen 104 is not blocking light in predetermined directions. Putting the optical selection screen 104 in a state of passing the light of the display screen 102 in all directions might be achieved by mechanically moving the optical selection screen 104. Alternatively the optical selection screen 104 is switched from one state into the other by means of applying an electric or magnetic field on the optical selection screen 104 to turn bars from a transparent state into a non-transparent state. Another embodiment of the optical selection screen 104 is described in connection with FIGS. 7A and 7B.

The single-view state might e.g. be used in a car to show detailed navigational information to the driver. For instance a map of a city with the names of the streets rendered on the display system. The resolution of the display system is twice as high in the single-view state as it is in the multi-view state. However the multi-view state might e.g. also be used to view a movie to the passenger and the driver in the case that the car has been parked.

FIG. 7A schematically shows the multi-view state of an embodiment of the optical selection screen 700 of a display system which is arranged to switch between a multi-view state and a single-view state. The optical selection screen 700 comprises a number of lenses 702-712 being placed within a reservoir 718 in which a liquid having a first refractive index which is substantially equal to a second refractive index of a material of the lenses 702-712, can be put and drawn off to switch the optical selection unit 700 between the single-view state and the multi-view state, respectively. FIG. 7B schematically shows the single-view state of the embodiment of the optical selection screen 700 as depicted in FIG. 7A. The liquid can be moved from a container 716 to the reservoir 718 by means of a pump. Optionally this pump is also designed to move the liquid back from the reservoir 718 to the container 716. Alternatively the liquid flows by means of gravity or capillary action. In the case of presence of the liquid in the reservoir 718 with lenses 702-712 the light from the display screen 102-is no longer bent and/or focused by means of the optical selection screen 104. As a consequence the light is passing both in the first direction 101 towards the first observer and in the second direction 103 towards the second observer. Because the material of the lenses 702-712 and the liquid have refractive indices which are substantially mutually equal, the bending by the lenses 702-712 is anticipated by the liquid.

Light from pixels intended for the first viewer reduces the viewing cone for the second viewer and vice versa. The size of the viewing cones is determined by the geometry of the light elements 110,112,120 and 122, black-spots 204-210 adjacent to the light elements 110,112,120 and 122 the medium, e.g. glass between the light elements and the bars 212-216 of the barrier as well as the width of the slits l in the barrier. The viewing cones generated by adjacent pixels as a function of the width of the slit l in the barrier have been determined. The cone of pixel j inside the glass is determined by two angles as specified in Equation 4 and 5:

$$\alpha(j)=\arctan(-l/2+b/2-jp) \quad (4)$$

$$\beta(j)=\arctan(-l/2-b/2-(j-1)p) \quad (5)$$

Because of refraction at the glass-air transition the final angles are as specified in Equation 6 and 7:

$$\tilde{\alpha}(j)=\arcsin(1.5\sin(\alpha(j))) \quad (6)$$

$$\tilde{\beta}(j)=\arcsin(1.5\sin(\beta(j))) \quad (7)$$

A description of the geometry and the parameters is given in FIG. 8. A first cone is determined by the two light rays 802 and 804 and a second cone is determined by the two light rays 806 and 808. The size of the pixel is denoted by p, the width of the black-spots by b, the thickness of the glass by d and the width of the slit in the barrier by l. In the calculations it is assumed that the index of refraction of the glass is 1:5. (Notice that $b=w_B$ and $p=w_{LE}+w_B$.)

In a first computation the following values were used: p=100 μm, d=700 μm and b=25 μm. The width of the slit l was varied. The angular distribution of the viewing cones generated by adjacent pixels as a function of the light transmission of the display system is plotted in FIG. 9A. The transmission T can be expressed as the product of two factors:

$$T = \frac{p-b}{p} \frac{l}{2p} \quad (8)$$

The first factor is the transmission of the display screen 102 due to the presence of the black-spots. The second factor is the transmission of the barrier 105. In FIG. 9A it can be observed that for a width of the slit l of zero, i.e. l=0, which corresponds with a transmission of zero, i.e. T=0 separated viewing cones are obtained each corresponding to one view. In FIG. 9A for 7 different views −3,−2,−1,0,1,2,3 the cones are depicted by means of the two maximum angles $\tilde{\alpha}(j)$ and $\tilde{\beta}(j)$ and the possible values in between these maximum values for a number of values of the transmission T. If the width of the slit l is increased, the views start to mix. The effective views, i.e. without cross-talk, become smaller and smaller when l is increased further. If the transmission T has increased above 0.4, individual views, i.e. without cross-talk cannot be observed anymore. In conclusion, applying dimensions that are typical for a normal of-the-shelf LCDs, the viewing cones are about 10 degrees if the transmission of the system is zero. By increasing the transmission, the size of the viewing cones reduces. So, such a set-up cannot fulfill the requirements for an automotive application.

To improve the performance of the front barrier two measures are proposed related to an of-the-shelf LCD display device as display screen 102. Firstly, the thickness of the glass substrate is reduced and secondly the pixel lay-out is rotated 90 degrees such that the long side of the sub-pixels, i.e. the red, green and blue components are in the horizontal direction. In other words the biggest size of the rectangular shaped sub-pixels is oriented substantially perpendicular to the biggest size of the slits.

First the reduction of the glass thickness is considered. For mobile phone applications, thin LCD displays are required. Therefore, the glass thickness is reduced to approximately 300 μm to 400 μm, by an etching process. If this glass thickness is used in the calculations, improved viewing zones are obtained. See FIG. 9B. However, the viewing cones of pixel −1 and 0 are still relatively small and probably not directed sufficiently towards the driver and passenger. In addition, the transmission T is very low in the regions where the views are separated.

Secondly, the pixel structure is changed such that the long side of the sub-pixel is in the horizontal direction. In a normal LCD the sub-pixels are oriented as denoted in FIG. 10. That means that the color filters run from top to bottom and the sub-pixels are smaller in the horizontal than in the vertical direction. However, for a multi-view display it is advantageous to have large pixels in the horizontal direction. Therefore, it is proposed to rotate the pixel structure by 90 degrees. See FIG. 11. The resulting viewing angles are shown in FIG. 9C, for a glass thickness d=700 μm.

In case both measures are combined, even more improved viewing zones and viewing cones that are directed in a better way to the driver and passenger are obtained. For glass width a thickness d=300 μm and sub-pixels that have their long side in the horizontal direction, i.e. p=300 μm the results are shown in FIG. 9D. In this case, the size of two important viewing cones 0,1 is large, if the transmission of the barrier is low. For a transmission of 0.3 there is still a viewing cone of more than 20 degrees. So, this design is suitable for an automotive application as discussed in the introduction.

It is assumed that the driver and passenger make the same angle with respect to the display. If the display is slightly rotated, for instance in the direction of the driver, the viewing cones should be adapted. This can be achieved easily. Instead of positioning the barriers in between adjacent pixels, the barrier are shifted towards the left or the right.

A relatively thin medium, e.g. glass between the light elements and the optical selection screen 102 is also required in the case that the optical selection screen 102 is based on lenses. It is also advantageous that the orientation of the sub-pixels related to the lenses is similar as is described for the slits.

FIG. 10 schematically shows the pixel structure and color filter layout as used in an off-the-shelve LCD. The color filters 1001-1012 are typically disposed in a vertical direction. The sub-pixels 1013-1016 are larger in the vertical direction than in the horizontal direction. A triple of three sub-pixels 1013-1016 together forms a single pixel.

FIG. 11 schematically shows the pixel structure relative to the optical selection screen 102. The direction of the bars or slits in the case of a barrier type optical selection screen 102 or the direction of the lenses in the case of a lens based optical selection screen 102 is indicated with the arrow 1113. The different sub-pixels 1101-1112, i.e. the red, green and blue color components are typically rectangular shaped. That means that each sub-pixel, i.e. light element, has a first size which $w_{LE}$ is larger than a second size. Typically the first size is three times bigger than the second size. As a result, a triple of sub-pixels is substantially square. In a display system according to the invention the sub-pixels are preferably disposed relative to the optical selection screen 102 such that the biggest edges of the sub-pixels are substantially perpendicular to the biggest edges of the bars or the lenses. Typically the lenses or bars are oriented in a vertical direction and the sub-pixels in a horizontal direction.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A display system comprising:
    a display screen for generating one or more images; and
    an optical selection screen for selectively passing at least one image in a direction towards at least one observer and passing at least one image in a direction towards another observer,
    wherein the optical selection screen includes one or more passing elements for passing one or more images in one direction and for passing one or more images in another direction, with at least some of the passing elements being arranged to obstruct one or more images in one direction and to obstruct one or more images in another direction and
    wherein the display screen includes two or more light elements of a first dimension disposed at a first distance from each other, with the sum of the first dimension and the first distance being substantially equal to a dimension of at least one passing element opening.

2. The display system of claim 1, wherein the display screen has at least one light element of a first light element dimension and a second light element dimension smaller than said first light element dimension, and at least one passing element opening of a first opening dimension and a second opening dimension smaller than the first opening dimension, with at least one light element being oriented with the first light element dimension substantially perpendicular relative to the first opening dimension of the at least one passing element opening.

3. The display system of claim 1, wherein the optical selection screen has one or more lenses for selectively passing one or more images in a direction towards at least one observer and passing one or more images in a direction towards at least one other observer.

4. The display system of claim 3, wherein a distance between a lens and a light element to which the lens belongs is at least somewhat different from a focal length of the lens.

5. The display system of claim 3, wherein, the display screen has at least one light element of a first light element dimension and a second light element dimension smaller than said first light element dimension, and at least one lens of a first lens dimension and a second lens dimension smaller than said first lens dimension, with at least one light element being oriented with the first light element dimension substantially perpendicular relative to the first lens dimension of the at least one lens.

6. The display system of claim 1, farther comprising receiving means for receiving positional information of at least one observer, wherein the display screen is a passive display screen with a directed back-light controlled on basis of the positional information of at least one observer.

7. The display system of claim 1, wherein the display screen includes a switching unit to switch the optical selection unit from a multi-view state of selectively passing one or more images in one direction and passing one or more other images in another direction to a single-view state of passing one or more images in one direction and another direction.

8. The display system of claim 7, wherein the optical selection screen comprises a number of bars which are designed to be switched between a transparent state and a non-transparent state.

9. The display system of claim 8, wherein the bars are switched between the transparent state and the non-transparent state on basis of an electric or magnetic field.

10. The display system of claim 7, wherein the optical selection screen includes one or more lenses placed in a reservoir in which a liquid having a first refractive index that is at least substantially equal to a second refractive index of a material of the one or more lenses, can be put and drawn off to switch the optical selection unit between the single-view state and the multi-view state, respectively.

11. A vehicle comprising:
    a display system for displaying images, the display system comprising:
    a display screen for generating one or more images; and
    an optical selection screen for selectively passing at least one image in a direction towards at least one observer and passing at least one image in a direction towards another observer,
    wherein the optical selection screen includes one or more passing elements for passing one or more images in one direction and for passing one or more images in another direction, with at least some of the passing elements being arranged to obstruct one or more images in one direction and to obstruct one or more images in another direction, and
    wherein the display screen includes two or more light elements of a first dimension disposed at a first distance from each other, with the sum of the first dimension and the first distance being substantially equal to a dimension of at least one passing element.

12. They vehicle of claim 11, wherein the display screen includes a switching unit to switch the optical selection unit from a multi-view state of selectively passing one or more images in one direction and passing one or more other images in another direction to a single-view state of passing one or more images in one direction and another direction, and wherein a sensor is included for detecting observer presence and for controlling the switching unit.

* * * * *